United States Patent [19]
Fantone et al.

[11] Patent Number: 4,786,154
[45] Date of Patent: Nov. 22, 1988

[54] ENHANCED-IMAGE OPERATING MICROSCOPE

[76] Inventors: Stephen D. Fantone, 11 Grant Rd., Lynnfield, Mass. 01940; Robert A. Pearlstein, 37 Knowles St., Newton Center, Mass. 02159

[21] Appl. No.: 942,257
[22] Filed: Dec. 16, 1986
[51] Int. Cl.[4] .................... G02B 21/36; G02B 21/22
[52] U.S. Cl. ............................. 350/508; 350/515; 350/538; 358/93
[58] Field of Search ............ 350/508, 511, 513, 514, 350/515, 520, 1.2, 1.3, 538; 358/93

[56] References Cited

U.S. PATENT DOCUMENTS

| | | |
|---|---|---|
| 3,124,682 | 3/1964 | Kojima et al. . |
| 3,624,400 | 11/1971 | Cohen . |
| 3,699,341 | 10/1972 | Quillinan et al. . |
| 3,743,825 | 7/1973 | Cohen . |
| 3,748,471 | 7/1973 | Ross et al. . |
| 3,820,870 | 6/1974 | Smith ............................ 350/511 |
| 4,115,802 | 9/1978 | Kramer et al. ................. 358/93 |
| 4,200,251 | 4/1980 | Borjesson et al. . |
| 4,249,797 | 2/1981 | Sendecki . |
| 4,266,129 | 5/1981 | Versteeg et al. . |
| 4,303,340 | 12/1981 | Hoffman ......................... 350/508 |
| 4,448,498 | 5/1984 | Miller et al. . |
| 4,467,190 | 8/1984 | Hadani ............................ 350/538 |
| 4,524,385 | 6/1985 | Billingsley et al. . |
| 4,576,432 | 3/1986 | Ruger ............................. 350/538 |
| 4,594,507 | 6/1986 | Elliot et al. . |
| 4,594,608 | 6/1986 | Hatae et al. ..................... 358/93 |
| 4,596,930 | 6/1986 | Steil et al. . |
| 4,655,562 | 4/1987 | Kreitzer et al. ................. 350/538 |

OTHER PUBLICATIONS

Research Devices, Inc. (brochure); Articles: B. G. Cohen: Infrared Microscopy; Technical Bulletin No. 1; Nondestructive Evaluation of Die Attach Bonds by Infrared Microscopy; Tec. Bull No. 2; Observing Strain Birefringence in Silicon Devices by Infrared Microscopy, Tech. Bull. No. 4.
Quantex Corporation; brochure-dated Jul. 1986.

Primary Examiner—John K. Corbin
Assistant Examiner—Jay Ryan
Attorney, Agent, or Firm—Saidman, Sterne Kessler & Goldstein

[57] ABSTRACT

An improved operating microscope includes a beamsplitter for splitting a portion of the visible image of the object, and an image enhancement device for performing image enhancement techniques on the split portion of the visible image. The enhanced visible image is then combined in real time with the unenhanced visible image so that a surgeon using the operating microscope sees the combined image. The combination provides automatic correlation of the enhanced image with the visible image. The present invention may be retrofit to existing microscopes, which in a preferred embodiment are binocular stereoscopic operating microscopes.

16 Claims, 2 Drawing Sheets

ENHANCED-IMAGE OPERATING MICROSCOPE

BACKGROUND OF THE INVENTION

1. Field of the Invention

This invention relates to improved operating microscopes, that is, to microscopes used by surgeons in performing surgical operations.

2. Related Art

Many thousands of operating microscopes, such as the Zeiss Company's OPMI microscopes, are in use throughout the world. U.S. Pat. No. 4,448,498 to Muller et al. shows such an operating microscope. These microscopes provide a surgeon with a binocular stereoscopic image in which he can observe his surgical implements in the operating field; he can perform the entire operation without looking directly at the subject. The Zeiss OPMI microscopes are optical (that is, provide a real image which is seen in an eyepiece), as opposed to an operating microscope providing a video image on a video screen or the like.

Conventional image enhancement techniques allow one to derive additional information from a visible image. Typically, mathematical techniques such as Fourier transformation are used to enhance or bring out details of the image which are obscured in the unenhanced image.

Such enhancement techniques typically involve producing an image signal responsive to an image of the object using an image sensor such as a charge-coupled device (CCD) image forming element. The image signal is then digitized, for example, using an analog-to-digital converter connected to the CCD image forming element. Data processing equipment and techniques are then used to provide the desired image enhancement. The enhanced image can then be displayed on a video display or the like. Insofar as such conventional image enhancement techniques have been applied to microscopes, the only display provided of the enhanced image has been a video display or the like. Performance of image enhancement tends to obscure the visible "landmarks" used by the surgeon to orient himself with respect to the tissues of the patient.

SUMMARY OF THE INVENTION

The present invention is an operating microscope in which the image of the object is split using a beamsplitter or the equivalent. A first portion of the image is passed through to the eyepiece without modification. This unaltered portion of the image is the ordinary visible image. The split portion of the image is then processed using image enhancement techniques so as to provide an enhanced image. The enhanced image is then combined with the visible image, and the combined images are presented at the eyepiece.

In this way the surgeon is simultaneously provided with the ordinarily visible landmarks, which he is accustomed to seeing in the visible image, and the detail shown in the enhanced image. The advantages of image enhancement are thus realized without the detrimental loss of physical landmarks and "clues" found in the visible image.

According to an aspect of a preferred embodiment of the present invention, in which it is configured as an aftermarket or retrofit image enhancement system for the Zeiss OPMI microscope, image enhancement capabilities can be readily and conveniently added to pre-existing equipment at relatively low cost and without impediment of the other functions of these microscopes.

BRIEF DESCRIPTION OF THE DRAWINGS

The invention will be better understood if reference is made to the accompanying drawings, in which.

DESCRIPTION OF THE PREFERRED EMBODIMENTS

Figure 1:
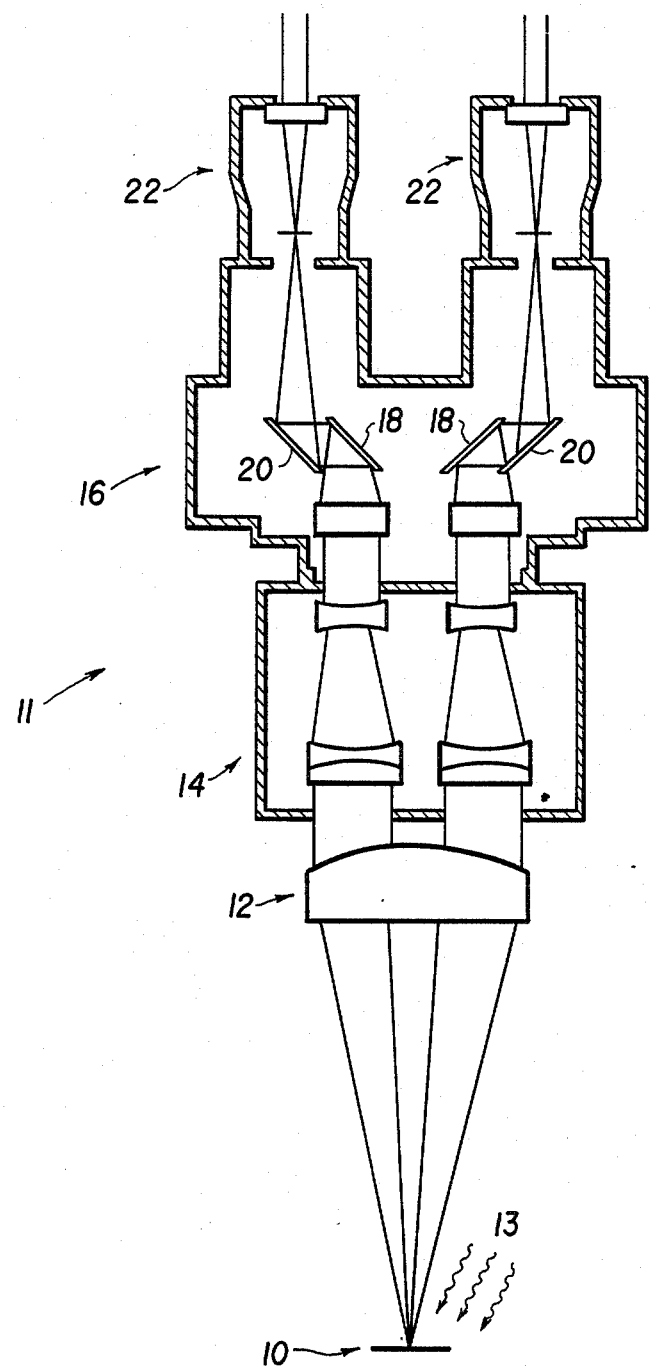
FIG. 1 shows schematically the optical path of the Zeiss OPMI microscope.

In a preferred embodiment, the microscope of the invention comprises a Zeiss OPMI microscope together with a retrofit attachment which provides additional features and functions according to the present invention. FIG. 1 shows in schematic form the optical principles of the Zeiss OPMI microscope 11. An object 10 is illuminated by visible light 13. A main objective lens 12 provides a first focusing function. A magnification changer 14 then provides further magnification of the object 10. As shown, the magnification changer 14 provides binocular stereoscopic images. The images provided by the magnification changer 14 are then provided to a binocular tube assembly 16, in which the images are reflected by prisms 18 and 20 to provide the proper spacing; the visible images thus formed are focused by eyepieces 22 for viewing by a surgeon. Observe that in the diagram of FIG. 1 the ray paths between the magnification changer 14 and the binocular tube 16 are collimated; this feature of the Zeiss OPMI microscope is desirable but not essential to the practice of the present invention.

Figure 2:
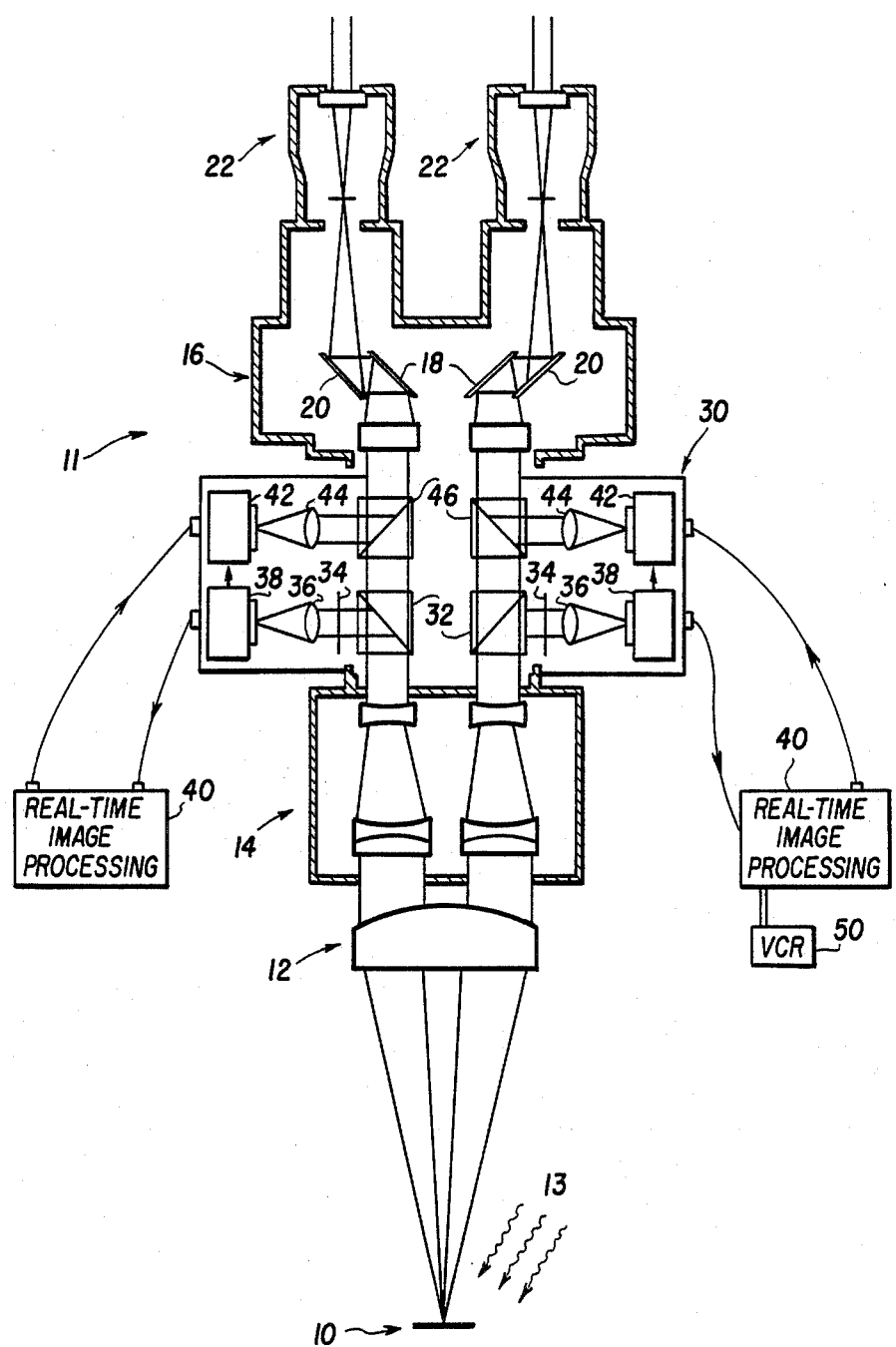
FIG. 2 shows schematically the optical path of the microscope according to the invention, in a preferred embodiment in which image enhancement is provided by a retrofit attachment to the Zeiss OPMI microscope of FIG. 1.

The modifications made to the Zeiss OPMI microscope according to the present invention are shown schematically in FIG. 2. According to the present invention, an image enhancement and summing device 30 is interposed between the magnification changer 14 and the binocular tube 16; the microscope 11 is not otherwise modified.

In keeping with the binocular stereoscopic nature of the Zeiss OPMI microscope 11, in the preferred embodiment of the present invention the image enhancement and summing device 30 has essentially identical mirror-image left and right halves. This enables the advantages of stereoscopic projection (that is, three-dimensional viewing of the object 10) to be obtained in combination with the advantages of image enhancement provided by the present invention. Both halves of the image enhancement device 30 comprise beamsplitters 32 which separate portions of the images provided by the magnification changer 14 from the main optical path.

The split portions of the images will typically but not necessarily then be filtered by narrow band pass filters 34 of conventional design, to separate out parts of the visible spectrum of interest. The remaining parts of the split portions of the images are focused by lenses 36 on sensors 38. Sensors 38 may be of any conventional type, such as Newvicon video tubes, charge coupled device (CCD) image forming arrays, or metal oxide semiconductor (MOS) type image forming sensors, and the like. Sensors 38 provide video signals as output. Other devices for forming the video image, such as one- or twodimensional scanning systems, for example, linear CCD arrays scanned across the image, are within the scope of the present invention. Multiple element sensors, each element sensitive to a different portion of the spectrum, are also within the scope of the invention.

The video signals output by the sensors 38 are then digitized and processed for enhancement of various features of interest on the object 10 by real time image processing devices 40. For example, the filtering of parts of the visible spectrum by filters 34 and subsequent image processing by real time image processing devices 40 may provide visual information to the surgeon concerning variation in tissue characteristics not otherwise visible. Any type of conventional image enhancement techniques can be employed.

The image enhancement techniques which may be employed include but are not limited to the following. Frequency-domain enhancement, which will typically comprise increasing the gain of a portion of specified frequency of the video signal provided by sensors 38, can be employed, for example to enhance a weak fluorescence of the object 10. Such frequency-domain enhancement may be performed by Fourier transformation of the video signal and selectively increasing the gain applied to portions of the transformed signal in production of the enhanced image.

Edge enhancement may also be performed. Typically this technique involves dividing the video image into picture elements ("pixels") and comparing the amplitude of a particular parameter (for example, color, density, or albedo) of each pixel to the amplitude of the same parameter in adjacent pixels. To produce the enhanced image, one then increases the gain applied to the pixels of the displayed image corresponding to those in which the change in the selected parameter is greatest. This may be done by taking the derivative of the parameter along a row (or column or both) of pixels, to identify the pixel of the row in which the rate of change of the parameter is greatest, and increasing the gain applied to the corresponding pixel in a displayed video image. The area outlined by the edge may be false colored.

Furthermore, while the converted image is literally a "false-color" image, even if it is essentially a gray-scale image, it is also within the scope of the present invention to provide a true multi-color converted image, in which various colors of the displayed image correspond to differing wavelengths of the reflected radiation. Multiple-element displays, each element displaying a different portion of the visible spectrum, are also within the scope of the invention.

As is well understood, edges represent high-frequency detail in an image, inasmuch as edges are sudden changes in a parameter. Edge enhancement thus may also be performed by increasing the high-frequency gain of the signal processing system of the present invention. This in turn may be accomplished by providing a nonlinear gain (that is, accentuating the high frequency response) in the video signal processing circuitry, which may be digital or analog in nature, or by increasing the gain applied to the high frequency components of a Fourier-transformed signal.

Texture enhancement may also be performed according to the present invention. This technique involves varying the gain applied to a portion of the image which exhibits a predetermined texture. The area exhibiting the texture to be enhanced may be located on the image by comparing the amplitude of a parameter of each pixel with that of pixels spaced a number of pixels away. For example, the signal level of each pixel may be compared to the same parameter for pixels spaced three, four, five and six pixels away. An area in which a particular repetitive pattern is detected in this manner may be identified as having a particular texture. The gain applied to the corresponding area of the displayed image may accordingly be varied to provide texture enhancement.

These and other image enhancement techniques and algorithms, specifically including convolutional and deconvolutional techniques (as these terms are understood in the art), which are useful in enhancing particular types of image structures, are within the scope of the present invention. These techniques and algorithms may be implemented using analog or digital techniques.

According to the present invention, the enhanced images provided by real time processing units 40 are then used to drive displays 42, which may be of any conventional type such as small cathode ray tube video displays, liquid crystal displays, CCD displays or the like. Multiple-element displays, each element displaying a different portion of the spectrum, are also within the scope of the invention. The enhanced images provided by displays 42 are focused as needed by lenses 44, and are then combined by beam combiners 46 with the visible images provided by the magnification changer 14. The combined visible and enhanced images are then provided in real time to the surgeon by way of mirrors 18 and 20 and eyepieces 22 as in the unmodified microscope. As shown, the combined visible and enhanced images may be recorded, separately or as combined, on a video recorder 50, a camera (not shown), or the like.

It will be appreciated that the real time combination of the visible image with the enhanced image according to the present invention has several advantages over an arrangement, for example, in which the enhanced image alone is displayed on a display screen which has to be viewed by the surgeon separately from the visible image viewed through the operating microscope. Specifically, suppose that the enhanced image shows that an area of tissue is diseased, while the outline of the diseased area is not visible on the unenhanced visible image. In enhancing the image, visible "landmarks" used by the surgeon to orient himself with respect to the tissues of the patient are frequently obscured. Therefore, in order for the surgeon to correlate the location of the diseased tissue shown in the enhanced image with the unenhanced visible image viewed in the operating microscope (that is, in order for the surgeon to determine where the diseased tissue is located on the patient), a "landmark" or another "clue" or indicia appearing in both images would have to be provided. In addition, the surgeon must view the enhanced and unenhanced images sequentially, which may not always be possible or desirable.

By comparison, the real time, superimposed combination of the enhanced and visible images provided by the present invention automatically provides a correlation between the enhanced image provided by the image enhancement device and the visible image, which includes the ordinarily-visible landmarks or clues.

As noted, in the preferred embodiment of the present invention the image enhancement subsystem 30 is provided as a retrofit to an existing Zeiss OPMI binocular stereoscopic microscope. Accordingly, two complete image enhancement and combining devices are provided. In this way the advantages provided by the present invention are provided to both sides of the stereoscopic microscope, further increasing the utility of the microscope according to the present invention while not interfering with its other desired attributes and operating advantages. Provision of image enhancement in a monocular or non-stereoscopic microscope is also within the scope of the present invention.

As mentioned above, one feature of the Zeiss OPMI microscope which makes it especially amenable to retrofitting with the image enhancement system of the present invention is the fact that the optical paths of the images are collimated between the magnification changer 14 and the binocular tube 16. This collimation simplifies interposition of the image enhancement and summing device 30. The fact that the Zeiss OPMI microscope is constructed in a modular fashion also encourages modification according to this aspect of the present invention. However, it will be appreciated that in general it will be possible to retrofit non-modular microscopes and ones not including a comparable collimated optical path with image enhancement and image combination apparatus according to the present invention.

It will further be appreciated that while the present invention has been described primarily in connection with a retrofit image enhancement system for addition to a preexisting microscope, the present invention also includes a complete microscope constructed according to the present invention.

Many modifications and improvements to the preferred embodiment of the present invention described above will occur to those of skill in the art, and are therefore within its scope. In particular, it would be possible to eliminate the beamsplitter 32 and filter 24 of each optical path in favor of a device for forming a video signal responsive to the image of the object, such as a CCD sensing array, an analog-to-digital conversion device for forming a digital signal responsive to the video signal, and a digital filter to select the video information of interest for image enhancement. After enhancement, the enhanced signal could then be digitally combined with the unmodified digitized video signal and used to drive a video display device, to provide the real time, superimposed combination of the visible and enhanced images.

Therefore, while a preferred embodiment of the present invention has been described, this should not be taken as a limitation on the present invention, but only as exemplary thereof; the present invention is to be limited only by the following claims.

We claim:

1. An improved operating microscope, comprising:
    optical means for defining a first optical path for a visible image of an object through said microscope from an object location to an eyepiece; and
    image enhancement apparatus, comprising:
    beamsplitter means located in said first optical path for splitting said visible image of said object into first and second portions;
    filter means, disposed in a second optical path connecting said beamsplitter means with an image formation means, for removing a part of said visible image from said first portion;
    image formation means for forming an image of the part of said first portion of the image not removed by said filter means, said image formation means and said beamsplitter means defining said second optical path;
    image enhancement means for enhancing the image formed by said image formation means;
    display means for displaying the enhanced image; and
    means for combining the displayed enhanced image with the second portion of the visible image and for permitting viewing of the combined images by way of said eyepiece means.

2. The operating microscope of claim 1 wherein said microscope is a binocular microscope and said image enhancement apparatus is provided in each of plural optical paths between said object and plural eyepieces.

3. The operating microscope of claim 1 wherein said image enhancement apparatus is provided in a manner suitable for retrofitting to existing microscopes.

4. An image enhancement system for retrofitting to an existing microscope, said microscope being of a type comprising optical elements for providing a visible image of an object at an eyepiece means, said image enhancement system comprising:
    beamsplitter means for splitting an image of the object into first and second portions and splitting said first portion from an optical image path defined by said microscope;
    filter means for removing a part of the visible spectrum from said first portion of the visible image split from said image path by said beamsplitter means;
    means for forming an image responsive to the remaining part of said first portion of said image;
    image enhancement means for enhancing selected portions of said formed image;
    display means responsive to said image enhancement means for forming a display of the enhanced image; and
    means for combining the displayed enhanced image with said second portion of the image of the object.

5. The system of claim 4 wherein said display means is video display means.

6. The system of claim 4 wherein said existing microscope is a binocular microscope having plural ray paths leading from an object to plural eyepieces, and wherein the elements of said image enhancement system are provided in duplicate, whereby combined images are provided at each of the eyepieces of the microscope.

7. The system of claim 4, wherein said existing microscope is binocular, and comprises a main objective lens means, a binocular tube connected to said eyepiece means, and a magnification changer interposed between said main objective lens means and said binocular tube, and wherein said image enhancement system is adapted to be interposed between said magnification changer and said binocular tube.

8. A method for production of an enhanced image at the eyepiece of an operating microscope, comprising the steps of:
    forming a visible image of an object;
    selectively enhancing a portion of the visible image by processing video signals derived from the visible image;
    combining the enhanced portion of the visible image with the visible image; and
    providing the combined images at said eyepiece for view.

9. The method of claim 8 wherein said enhanced image is displayed on video display means and is optically combined with the visible image of the object.

10. The method of claim 8 comprising the additional step of separating a portion of the visible image for enhancement.

11. The method of claim 10 comprising the additional step of filtering the separated portion of the visible image.

12. Apparatus for production of combined visible and enhanced images of an object at the eyepiece of a microscope, comprising:

means for forming a visible image of said object;

means for selectively enhancing portions of the visible image of said object by processing video signals derived from the visible image;

means for combining the enhanced image of the object with the visible image of the object; and means for providing the combined images at said eyepiece for view.

13. The apparatus of claim 12 further comprising display means for displaying the enhanced image.

14. The apparatus of claim 13 wherein said display means is video display means.

15. The apparatus of claim 14 wherein said enhanced image is combined with the visible image in optical image combining means.

16. The apparatus of claim 12 further comprising means for separating a portion of said visible image for enhancement by said means for selectively enhancing.

* * * * *